Patented June 25, 1946

2,402,703

UNITED STATES PATENT OFFICE 2,402,703

METHOD OF PRODUCING NEUTRAL ESTERS OF MOLECULARLY DEHYDRATED PHOSPHORIC ACIDS

Willard H. Woodstock, Flossmoor, Ill., assignor to Victor Chemical Works, a corporation of Illinois No Drawing. Application August 6, 1942, Serial No. 453,816

6 Claims. (Cl. 260—461)

This invention relates to a method of producing neutral esters of molecularly dehydrated phosphoric acids and the products so produced. More particularly, it relates to the production of neutral alkyl esters of phosphoric acids more dehydrated than orthophosphoric acid, and preferably the neutral alkyl esters of polyphosphoric acids.

While some investigators have claimed the production of neutral mixed esters of metaphosphoric acid by the reaction of alcohol and metaphosphoric acid, it has not been demonstrated that such compounds have been produced, nor is such production theoretically possible. The present invention provides a simple effective method for producing neutral esters of all of the molecularly dehydrated phosphoric acids. The process of the present invention is carried out by reacting the correct proportion of phosphorus pentoxide with the corresponding trialkyl orthophosphates. The equation for this reaction in the case of the metaphosphate esters may be written as follows:

where R is an alkyl group.

Neutral esters of pyro and polyphosphoric acids may also be produced in the same manner by employing the appropriate proportions of the reactants. Typical equations are:

Tetrapolyphosphoric esters

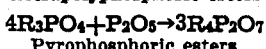
Pyrophosphoric esters

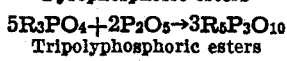
Tripolyphosphoric esters

The reaction is carried out in a cooled reaction vessel equipped with an agitator. The tertiary orthophosphate ester if liquid is placed in the vessel with or without an inert solvent or reaction medium; if solid it is dispersed or dissolved in an inert medium such as toluene, carbon tetrachloride, chloroform, or the like. Phosphoric anhydride is then gradually added to the vessel until the required amount is added. The reaction mixture is agitated and warmed if necessary to effect completion of the reaction. Initial cooling of the reaction mixture may be necessary if the $P_2O_5$ is added too rapidly.

Examples 350 grams of $P_2O_5$ were slowly added to 350 grams of well cooled trimethyl orthophosphate in a water jacketed reaction vessel, and agitated until the $P_2O_5$ was completely reacted. The resulting methyl metaphosphate ester product was a heavy, viscous, amber colored liquid, having a specific gravity of 1.620, a refractive index of 1.439, and a decomposition point at 150–155° C.

Butyl metaphosphate prepared in a similar manner from equal mole proportions of tributyl orthophosphate and $P_2O_5$ in a toluene solvent medium was, when separated from the solvent medium, a viscous amber colored liquid having a specific gravity of 1.227 and a refractive index of 1.445. In this case it was necessary to keep the reaction temperature below 60° C. in order to avoid decomposition with liberation of butylene.

Octyl metaphosphate was prepared by reacting equal mole proportions of trioctyl orthophosphate with phosphorus pentoxide in a chloroform reaction medium. After the reaction was completed the chloroform was removed by bubbling air through the reaction mixture under a reduced pressure. The product was a liquid of 1.151 specific gravity having an index of refraction of 1.450. The product was somewhat unstable at room temperature and slowly decomposed over a period of several weeks. It was, however, sufficiently stable to permit its use as an intermediate reagent in the production of other organic phosphorus containing compounds.

Neutral octyl pyro and tetraphosphate esters were produced in a similar manner by reacting the proper mole proportions of trioctyl orthophosphate and $P_2O_5$. The pyrophosphate ester was a liquid of 0.977 specific gravity with an index of refraction of 1.443. The tetraphosphate ester had a specific gravity of 1.053, and an index of refraction of 1.447. Both esters were quite stable at room temperature.

Tetramethyl pyrophosphate was prepared by reacting 300 grams of trimethyl phosphate with 76 grams of $P_2O_5$ at a temperature below 50° C. until the $P_2O_5$ was completely dissolved. About two hours was required for the reaction. The product when filtered was a clear, water soluble amber colored, mobile liquid, having a specific gravity of 1.357 and an index of refraction of 1.410 at 25° C. It was stable against decomposition at temperatures as high as 175° C.

Hexaethyl tetrapolyphosphate was similarly prepared by reacting 400 grams of triethyl orthophosphate and 156 grams of $P_2O_5$. The product was a viscous liquid having a specific gravity of 1.280, an index of refraction of 1.425, and a decomposition point of approximately 145° to 150° C.

Butyl tripolyphosphate (($C_4H_9$)$_5P_3O_{10}$) a liquid of 1.095 specific gravity with an index of refraction of 1.435 and a decomposition point of 148°–153° C., was prepared by reacting five moles tributyl orthophosphate with two moles of $P_2O_5$ at a temperature of 50°–60° C.

Ethyl tripolyphosphate was prepared in a similar manner as a viscous liquid having a specific gravity of 1.245, an index of refraction of 1.424, and a decomposition point of about 170° to 175° C.

The neutral esters of the molecularly dehydrated phosphoric acids are highly reactive and are suitable as reagents for the preparation of a number of different types of organic phosphorus containing compounds. They may be reacted with water or alcohols to produce mono and diorthophosphate esters, mixtures of esters and mixed esters, or with ammonia or amines to produce amides or substituted amide orthophosphate esters, etc. If used as an intermediate in the production of other compounds, the neutral ester products need not be separated from the solvent in which they were prepared in case a solvent is employed. In this way ester products may be prepared and used, which are normally too unstable at ordinary temperatures for efficient separation from their solvent reaction medium. In general it is preferred that the metaphosphate esters containing more than four carbon atoms be prepared in a solvent medium. The pyro and polyphosphate esters in general have higher decomposition points than the metaphosphate esters.

The reaction is, of course, carried out at a reaction temperature sufficiently low that the desired ester product is not decomposed.

As will be observed from the specific examples, the molecular ratio of phosphorus pentoxide to the orthophosphate ester is from ¼ to one mole of phosphorus pentoxide to one mole of orthophosphate ester.

By polyphosphoric acid we mean those phosphoric acids more molecularly dehydrated than pyrophosphoric acid and less dehydrated than metaphosphoric acid. Triaryl orthophosphates also react with phosphoric anhydride to produce molecularly dehydrated phosphoric products in the same manner as the alkyl type compounds.

Mixed esters may be prepared by reacting mixed trialkyl orthophosphates with $P_2O_5$. Neutral mixed alkyl esters of polyphosphoric acid may thus be prepared or neutral mixed alkyl phosphates of a phosphoric acid more dehydrated than orthophosphoric acid.

The term "neutral" ester as herein used means one not containing any acid hydrogen or any OH group.

The foregoing detailed description is given for clearness of understanding only and no unnecessary limitations should be understood therefrom.

What I claim as new, and desire to secure by Letters Patent, is:

1. The method of producing a neutral ester of a molecularly dehydrated phosphoric acid which comprises reacting an anhydrous tri-ester of orthophosphoric acid with a selected reacting proportion of phosphorus pentoxide from ¼ to 1 times the molecular equivalent of trialkyl orthophosphate ester.

2. The method as set forth in claim 1 in which the reaction is carried out at a temperature below that at which the desired ester product decomposes.

3. The method of producing neutral alkyl tripolyphosphate esters which comprises reacting five moles of trialkyl orthophosphate ester with two moles of phosphorus pentoxide.

4. The method of producing neutral metaphosphate esters which comprises reacting one mole of trialkyl orthophosphate ester with one mole of phosphorus pentoxide.

5. The method of producing neutral pyrophosphate esters which comprises reacting four moles of trialkyl orthophosphate ester with one mole of phosphorus pentoxide.

6. The method as set forth in claim 1 in which the reaction is carried out in an inert liquid medium.

WILLARD H. WOODSTOCK.